United States Patent [19]

Aldridge

[11] Patent Number: 4,573,719
[45] Date of Patent: Mar. 4, 1986

[54] KNOT TYING APPARATUS

[76] Inventor: Donald J. Aldridge, Rte. #1, Box 172L, Peshtigo, Wis. 54157

[21] Appl. No.: 698,120

[22] Filed: Feb. 4, 1985

[51] Int. Cl.⁴ ............................................. D03J 3/00
[52] U.S. Cl. ........................................ 289/17; 223/99
[58] Field of Search ........................... 289/1.2, 1.5, 17; 223/99

[56] References Cited

U.S. PATENT DOCUMENTS

| | | | |
|---|---|---|---|
| 886,375 | 5/1908 | Koon | 223/99 |
| 2,332,655 | 10/1943 | Miles | 289/17 X |
| 2,682,126 | 6/1954 | Shepherd | 223/99 X |
| 2,734,299 | 2/1956 | Masson | 289/17 |
| 3,357,086 | 12/1967 | Hood | 223/99 X |
| 3,402,957 | 9/1968 | Peterson | 289/17 |
| 3,782,764 | 1/1974 | Browning | 289/17 |
| 3,877,737 | 4/1975 | Chappell | 289/17 |
| 4,029,346 | 6/1977 | Browning | 289/17 |

Primary Examiner—Louis K. Rimrodt
Attorney, Agent, or Firm—Russell L. Johnson

[57] ABSTRACT

An apparatus for facilitating the securing of the free end of a line to a line attachment. Such attachments might be hook eyes, swivels, lures, fishing leaders, and the like which are commonly used in fishing with hook and line. The apparatus employs a rotating arm which wraps the free end of a line around the source line without twisting the source line to facilitate the tying of a clinch knot and other similar knots. The instrument has incorporated in or attachable to its structure; a line cutter, attachment holding means, a novel hook eye threader, and a light.

10 Claims, 16 Drawing Figures

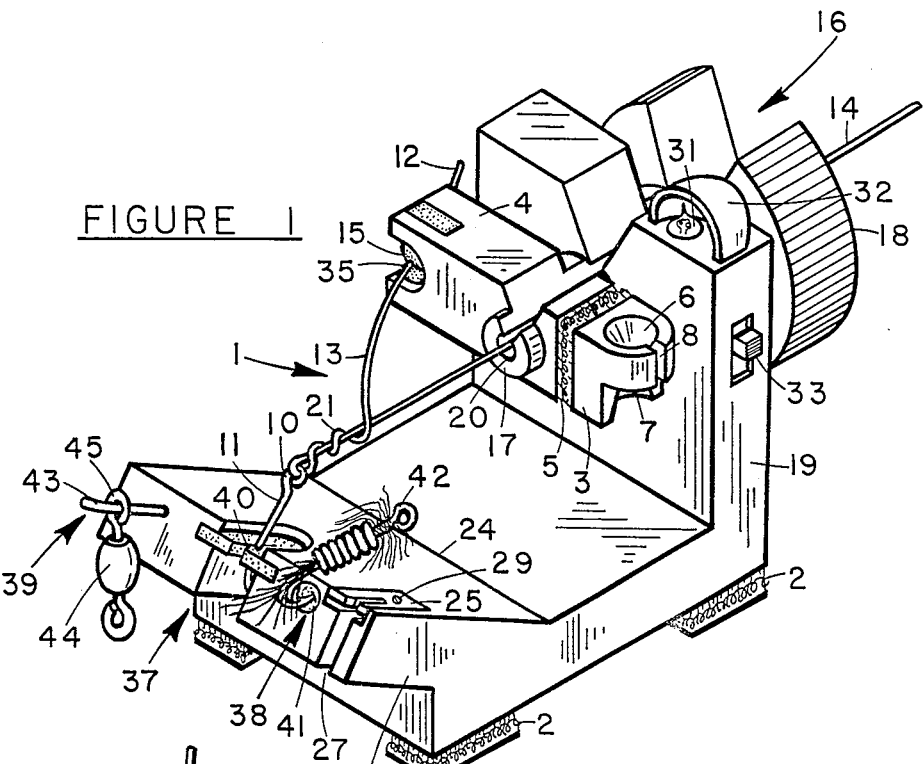
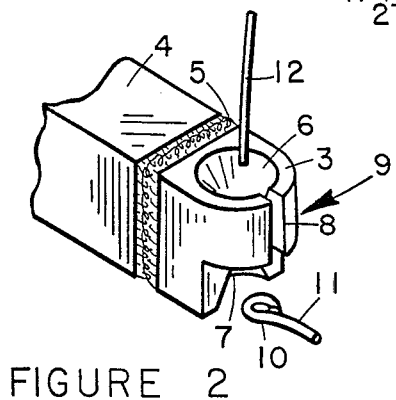
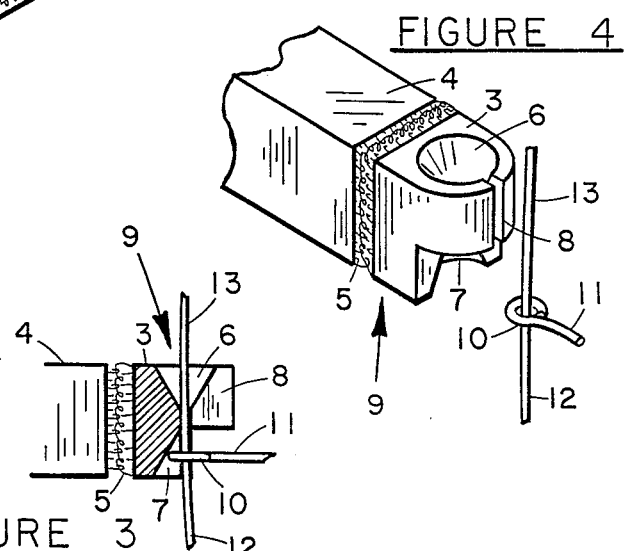
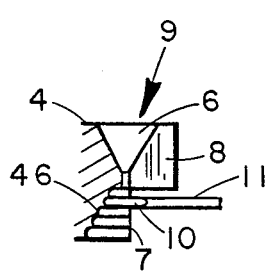
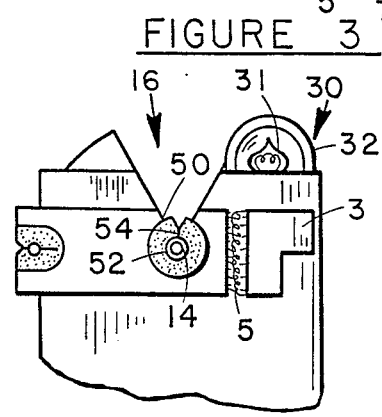
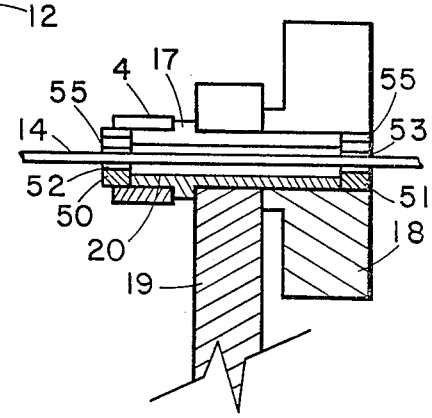

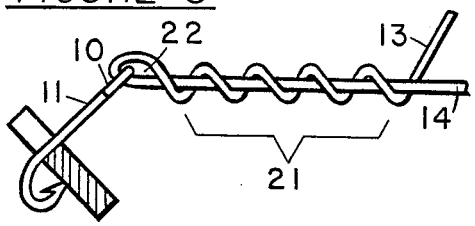
FIGURE 8
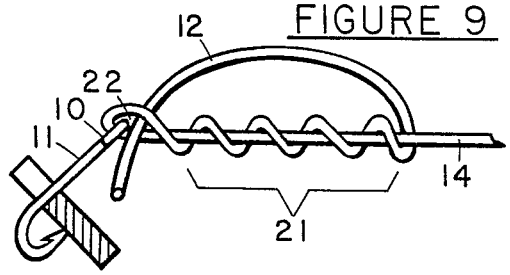
FIGURE 9
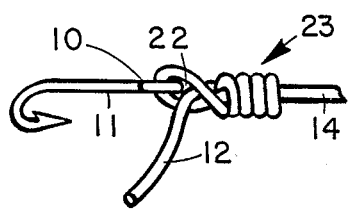
FIGURE 10
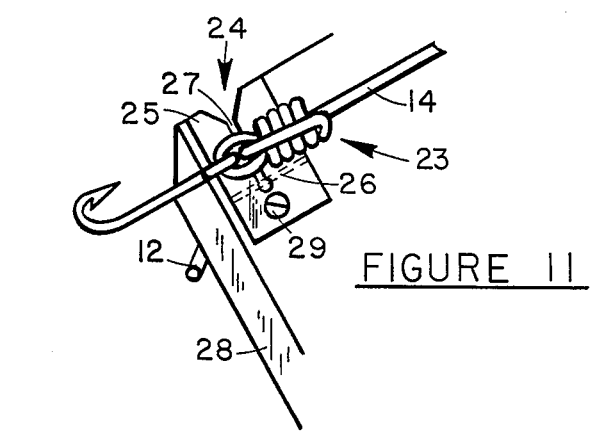
FIGURE 11
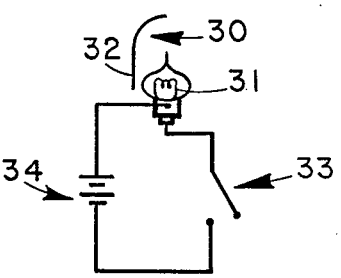
FIGURE 12
FIGURE 13
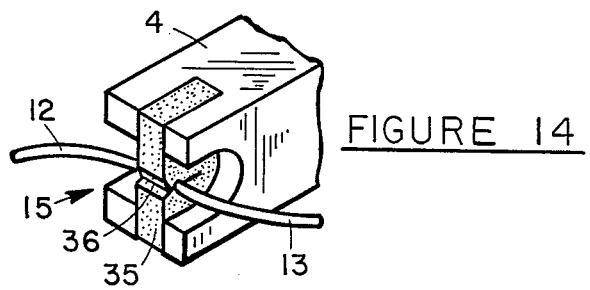
FIGURE 14
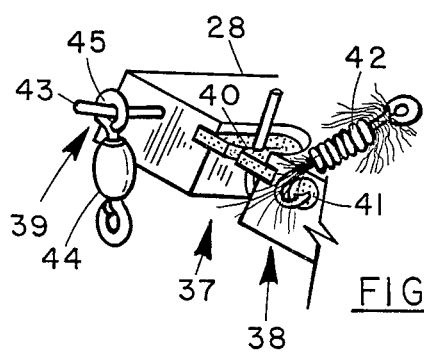
FIGURE 15
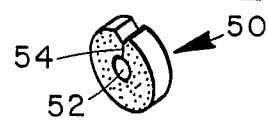
FIGURE 16 ial view of the preferred embodiment of the apparatus of this invention.

KNOT TYING APPARATUS

FIELD OF THE INVENTION

When fishing with hook and line from a small boat, from the bank of a river, or when wading in a stream, the conditions are seldom ideal for tying a clinch knot or similar knots. A properly tied clinch knot involves passing the free end of a line through a loop or eye in an attachment, looping the free end of the line back over the source line, wrapping the free end of the line around the source line a number of times, passing the free end of the line through the loop thus formed, drawing the knot tight and cutting off of the excess of the free end of the line.

Clinch knots tied in the field usually involve twisting the free end of the line and the source line about each other two or three times and inserting the free end of the line through the loop. The knot is then pulled tight and thereafter the excess at the free end of the line is removed. The result is twists in the source line and a knot which is not sufficiently wrapped to be secure under a heavy pull.

OBJECTS

It is therefore an object of this invention to provide small economical and portable apparatus for aiding in the securing of fishing attachments to a line by means of a clinch knot wherein the knot is formed by wrapping the free end of the line around the source line as opposed to twisting the two lines about each other.

It is further an object of this invention to provide the above described apparatus wherein means are provided to aid in the threading of the line, the holding stationary the joining portion of a variety of attachments, and the trimming of the free end of the line from the completed knot.

Other objects will become apparent from the following specifications, drawings, and claims.

BRIEF DISCUSSION OF THE PRIOR ART

The prior art may be divided into two groups for the purposes of discussion. The first group comprises bench and commercial units which are not suitable for use while fishing. The second group comprises small portable knot tying apparatuses. All knot tying apparatuses involve; an attachment, which may be broadly defined as "that which is to be attached to the line", an attachment holding means, a line which passes through or around the attachment, dividing the line into what will hereinafter be called a "free end segment" and "a source line segment", and a means for manipulating the attachment and/or the line segments to form a knot.

U.S. Pat. No. 2,332,655 to Miles is representative of apparatuses in the first group. It relates to the instant invention in that Miles teaches a means for wrapping the line around an attachment as opposed to twisting the lines to tie a knot.

U.S. Pat. No. 2,734,299 to Masson and U.S. Pat. No. 3,877,737 to Chappell are representative of apparatuses in the second group. Masson teaches the use of slotted, puncturable, resilient materials (cork) for gripping and holding lines and attachments. Chappell teaches a slotted rotatable shaft which permits the locating of a line along the axis of the shaft.

The instant invention may be seen as incorporating elements common to knot tying apparatuses along with elements taught by Miles, Masson, and Chappell into a novel construction for a knot tying apparatus wherein a free end of a line is wrapped around the source line to facilitate the tying of a clinch knot or the like.

By holding the attachment stationary so that the line may be wrapped instead of twisted the device of this invention may serve to join a line to attachments such as large artificial lures and long pretied leaders where such attachments are outside the capabilities of prior art knot tying devices, which rotate the attachment while holding the line segments stationary.

BRIEF DESCRIPTION OF THE INVENTION

The invention in its simplest form may be characterized as being a portable knot tying apparatus having a base which is securable to a stable surface, the base having upward projecting members; an attachment holding member and a shaft support member, a shaft rotatable in the shaft support member and having an axial bore directed towards the attachment holding member, a winding arm secured to the shaft and projecting radially from the shaft and having a slotted resilient line gripper secured to the distal end of the arm, a radial slot passing through the shaft support, the arm and the shaft and communicating with the central bore so that when the slotted portion of the shaft and the arm is aligned with the slot in the shaft support a line may be passed through the slot into or out of alignment with the axis of rotation of the central bore.

The utility of the invention in its simplest form may be enhanced by incorporating into the constructions of the apparatus means for threading the free end of a line through a hook eye or the like, a multiplicity of attachment holding means to accommodate to the different requirements arising from the need to attach a fishing line to hooks of various sizes, lures of various sizes and construction, swivel elements, various constructions of fishing tackle and loops such as those found on pretied leaders and other preassembled leaders and the like, a means for cutting lines before and/or after knotting and a hooded light to render the apparatus usable at night.

BRIEF DESCRIPTION OF THE DRAWINGS

FIG. 1 is a pictorial view of the preferred embodiment of the apparatus of this invention.

FIG. 2 is a broken off pictorial view of a hook threader attached to the winding arm of the apparatus of FIG. 1.

FIG. 3 is a partially sectioned elevational view of the threader and arm of FIG. 2.

FIG. 4 is a pictorial view similar to that of FIG. 2 showing the threader in operation.

FIG. 5 is a cross sectional elevational view of an alternative embodiment of the threader of FIGS. 2 through 4.

FIG. 6 is a broken out elevational view of the winding mechanism of the apparatus of FIG. 1 as viewed perpendicular to the axial bore.

FIG. 7 is a broken out partially sectioned elevational view of the mechanism of FIG. 6 taken along the axial bore.

FIG. 8 is an elevational view showing wraps being placed around a source line.

FIG. 9 is an elevational view showing the free end of a line being passed through a loop in a wrapped line.

FIG. 10 is an elevational view of the knot formed by the steps illustrated in FIGS. 8 and 9.

FIG. 11 is a pictorial view of a line cutter being employed to trim the excess free line of the knot of FIG. 10.

FIG. 12 is a pictorial view of the finished knot as secured to a hook attachment.

FIG. 13 is an electrical schematic for a battery operated light incorporated in the shaft support member of the apparatus of FIG. 1.

FIG. 14 is a broken out pictorial view of a line gripper incorporated into the winding arm of the apparatus of FIG. 1.

FIG. 15 is a broken out pictorial view of the attachment holding member of the device of FIG. 1.

FIG. 16 is a pictorial view of a line guide insert for the device of FIG. 1.

DETAILED DESCRIPTION OF THE INVENTION

In the figures like numbers refer to like objects. Referring now to FIG. 1. The apparatus 1 of this invention is intended to facilitate the tying of the clinch knot commonly used by anglers. In counter distinction to prior art knot tying apparatuses which serve only to tie knots, the device of this invention provides means for performing most of the functions attendant with securing an attachment to a line for nearly all knot tying circumstances encountered when fishing with hook and line.

Apparatus 1 may be attached to any stable structure by any appropriate means, screws, magnets spring clips or Velcro TM (3M Co. of Minn.) such as fastener 2 as shown in FIG. 1. Such attachment serves to free both hands to manipulate the line, the attachment, and apparatus 1. For illustration purposes the tying of a fishing line to a fish hook will be described in detail hereinafter. The tying of other attachments to a fishing line may be different in some details but the operating principles of the apparatus are not changed.

Threading the free end of a line through a hook eye is sometimes difficult to achieve under the best of conditions and under adverse conditions can be downright aggravating and frustrating. The device of this invention is provided with a novel threading device. As illustrated in FIGS. 1 through 5, threader 3 is detachably secured to winding arm 4 by Velco TM coupling 5. The Velcro TM coupling permits the securing of threader 3 to a creel or rod butt when wading as in a stream where a stable mount for apparatus 1 is not readily available without leaving the stream.

Threader 3 has a unitary body 9 defining two opposed coaxial conical guides, upper conical line guide 6 and lower conical eye guide 7 which intersect near their vertices. A line removal slot 8 communicates radially from guides 6 and 7 to the outside of body 9 of threader 3. Lower eye guide 7 is sectioned diametrically so as to expose half of guide 7 to the placing of a hook eye directly against the converging walls of eye guide 7.

In use eye 10 of hook 11 is placed in guide 7, free end 12 of line 13 is passed through conical line guide 6 which directs free end 12 through hook eye 10. Hook 11 is then withdrawn from guide 7, carrying line 13 through line removal slot 8.

Referring now to FIG. 5. Arm 4 may have formed into its structure threader 3. The utility of threader 3 may be further enhanced by the provision of circumferential grooves 46 to eye guide 7 to serve as indices for various size hook eyes 10.

Hook 11 carrying line 13 in hook eye 10 is then secured in hook holder 37 which will be described in detail hereinafter. Free end 12 of line 13 is then secured in line gripper 15 of arm 4. With bore access groove 16 of arm 4, shaft 17 and knob 18 aligned with the mating segment of groove 16 in shaft support member 19 as shown in FIGS. 1, 6, and 7, source line 14 is laid along the axis of bore 20.

Referring now to FIGS. 1 and 8 through 11. While holding even tension on source line 14 knob 18 is rotated the required number of revolutions causing arm 4 to revolve around source line 14 and place wraps 21 around source line 14. It should be noted that the novel construction of this device permits the placing of any number of wraps around source line 14 without twisting source line 14. As shown in FIG. 9, free end 12 is then passed through loop 22 adjacent to eye 10 of hook 11 and thereafter tension is applied to free end 12 and source line 14 causing wraps 21 to close loop 22 against eye 10 to form clinch knot 23 as shown in FIG. 10.

The tying of clinch knot 23 requires that free end 12 be longer than desired in the finished knot due to the need to grip free end 12 to pull it snug when drawing the knot tight. If free end 12 is cut too short there is a danger that knot 23 will come undone under heavy tension. If free end 12 is left too long it becomes a nuisance and tends to catch on things.

To insure easy and correct shortening of free end 12 the device of this invention is provided with a line cutter 24. Cutter 24 as shown in FIGS. 1 and 11 comprises a slotted cover 25 and an underlying sharpened blade 26, both of which are secured in alignment with guide slot 27 of attachment holding member 28 by screw 29. In use free end 12 is guided into guide slot 27 while clinch knot 23 is slid over slotted cover 25 until free end 12 engages blade 26 and is severed thereby.

The result of these operations is a secure and properly formed clinch knot such as that illustrated in FIG. 11.

The utility of apparatus 1 may be greatly enhanced by providing the device with a hooded light 30 incorporated in the structure of shaft support member 19 as shown in FIG. 1 and illustrated schematically in FIG. 13. Hood 32 serves to direct light towards the knot tying areas of apparatus 1 while preventing the light from shining in the eyes of the operator. The hooded light is of conventional flashlight construction wherein a battery 34 is in series with a light bulb 31 which is in series with a switch 33. Switch 33 serves to open and close the circuit and thereby turn light bulb 31 on and off.

The above describes the operation of the knot tying apparatus of this invenion as it would serve to thread the line, tie the knot and trim the excess free end of the line as well as a light for use at night.

The utility and novelty of the apparatus of this invention is further augmented by the frictional gripper employed in line gripper 15 and the attachment holding means incorporated with the attachment holding member.

As shown in FIG. 14 line gripper 15 comprises a slotted gripper element 35 which is recessed into arm 4. Gripper element 35 is in the preferred embodiment formed from rubber belting, but similar cutable, puncturable, resilient, high friction materials such as neoprene and urethane will also serve. A novel feature of gripper element 35 of line gripper 15 is that it permits free end 12 to slide through the slot with resistance and thereby maintains tension on free end 12 while at the same time metering out line to form wraps 21.

As shown in FIGS. 1 and 15, attachment holding member 28 is provided with hook holder 37, small lure holder 38 and swivel and loop holder 39. Hook holder 37 comprises slotted puncturable resilient hook gripper 40 which is of rubber belting material and the like. Hook holder 37 functions as illustrated in conjunction with FIGS. 1, 8 and 9.

As shown in FIGS. 1 and 15, small lure holder 38 is a plug 41 of resilient puncturable material such as rubber belting material and the like recessed into the top of attachment holding member 28. Small hooks and particularly small flies such as fly 42 employ the shank of the hook to form the body of the fly and conceal the hook. Hook holder 37 would not therefore by as useful as small lure holder 38 for attaching such small lures to a line.

Attachments such as swivels, large lures having swivel attachments, and line loops such as those of preassembled pretied leaders present problems in preventing the rotation of the attachment while tying a knot. For tying knots to such attachments the device of this invention is provided with swivel and loop holder 39. Holder 39 comprises a bent rod 43 of small diameter secured to the top of attachment holding member 28 as illustrated in FIGS. 1 and 15. Barrel swivel 44 serves to illustrate how rod 43 can be inserted through the eye 45 of the swivel and thereby prevent its rotating during the knot tying process.

Referring now to FIGS. 6, 7, and 16. Shaft 17 may be provided at its ends with retainer disks 50 and 51. For some operations it may be seen as desirable to provide an encircling guide for source line 14. Retainer disks 50 and 51 have cylindrical line guides 52 and 53 respectively which are entered by way of resilient detents 54 and 55 respectively. In use, source line 14 is held near the centerline of axial bore 20 of shaft 17 in cylindrical line guides 52 and 53 during the rotation of shaft 17. Retainer disks may be formed of the resilient belting material such as rubber belting and the like.

The preferred embodiment of the invention has been disclosed herein. However, the scope of the invention should not be limited to the scope of the disclosed embodiment but should only be limited to the scope of the appended claims and all equivalents thereto which would become apparent to one skilled in the art.

I claim:

1. A portable apparatus for wrapping a free end of a line about a source line for the purpose of forming a knot and comprising;
   (a) a base having a top and bottom surface and the bottom surface is detachably securable to a stable surface by a securement means,
   (b) an attachment holding member projecting upward from the top surface of the base and having as a part thereof at least one attachment holding means,
   (c) a shaft support member projecting upward from the top surface of the base and spaced apart from the attachment holding member,
   (d) a shaft having an axial bore directed towards the attachment holding member and rotatably mounted in the shaft support member and the shaft has a winding arm projecting radial from and mounted to the shaft at a location near the end of the shaft and positioned between the attachment holding member and the shaft support member and a turning knob is secured to the shaft, and the shaft, the knob, and the arm define a longitudinal slot which communicates from the axial bore of the shaft to the outside of the shaft, knob, and arm so that when the slot is aligned with a mating slot in the shaft support a line may be passed through the slots into the axial bore of the shaft, and
   (e) a line holding means attached to the winding arm at a location near the end of the arm most distant from the shaft.

2. The apparatus of claim 1 wherein the line holding means is a slotted flat piece of resilient, puncturable, and cutable material secured to the arm.

3. The apparatus of claim 1 wherein an attachment holding means is a small diameter rod projecting from the top of the attachment holding member.

4. The apparatus of claim 1 wherein an attachment holding means is a flat piece of resilient, puncturable, cutable material secured to the holding member.

5. The apparatus of claim 1 wherein an attachment holding means is a cylinder of resilient, puncturable material recessed into the holding member.

6. The apparatus of claim 1 wherein the apparatus is provided with a line cutter comprising an edged cutting member overlaid with a slotted line guide which aligns with a mating slotted line guide in the body of the holding member so that when a line is drawn into the slotted line guide the line is guided against the edged member and severed thereby.

7. The apparatus of claim 1 wherein the shaft support member has incorporated into its structure a hooded light comprising a battery in series with a light bulb in series with an on off switch which makes and breaks a circuit to initiate and terminate the flow of electricity in the circuit and a hood which directs light from the bulb towards the attachment holding member.

8. The apparatus of claim 1 wherein the shaft is provided with at least one guide disk, the guide disk defining a central cylindrical bore which is coaxial with the bore of the shaft and having adjacent thereto a portion of the guide disk forming a resilient detent through which a line may be passed into and taken out from the cylindrical bore by means of resiliently deforming the detents.

9. An eye threading guide which is attachable and detachable from the arm of a knot tying apparatus comprising a one piece body having a top surface parallel to a bottom surface and a side surface perpendicular to the top and bottom surface and the body defines a short small diameter cylindrical bore perpendicular to and between the top and bottom surfaces and the bore communicates with a top conical line guide bore which is largest at its intersection with top surface and which intersects the cylindrical bore near the vertex of the conical bore and a bottom conical eye guide bore which is largest at its intersection with the bottom surface and which intersects the cylindrical bore near its vertex and the eye guide bore is bisected along diametrically opposed elements of the conical bore to permit access for a hook eye to the tapered sides of the eye guide bore and the body of the threading guide further defines an entry slot which communicates between the outside of the body and the common axis of the conical guides and the cylindrical bore.

10. The threading guide of claim 9 wherein the bottom eye guide bore is provided with circumferential grooves to serve as indices for hook eyes of various diameters.

* * * * *